United States Patent
Chen et al.

(10) Patent No.: US 6,867,732 B1
(45) Date of Patent: Mar. 15, 2005

(54) EMBEDDED MULTI-FUNCTIONAL PREPROCESSING INPUT DATA BUFFER IN RADAR SYSTEM

(75) Inventors: Shin-An Chen, Sanchong (TW); Sheng-Hsing Yang, Hsinchu (TW); Yu-Lin Su, Taoyuan (TW)

(73) Assignee: Chung Shan Institute of Science and Technology, Armanents Bureau, M.N.D., Taoyuan (TW)

( * ) Notice: Subject to any disclaimer, the term of this patent is extended or adjusted under 35 U.S.C. 154(b) by 0 days.

(21) Appl. No.: 10/916,004

(22) Filed: Aug. 10, 2004

(51) Int. Cl.[7] .......................... G01S 13/52; G01S 13/00
(52) U.S. Cl. ...................... 342/160; 342/159; 342/175; 342/194; 342/195
(58) Field of Search .................. 342/82–103, 159–164, 342/175, 189–197

(56) References Cited

U.S. PATENT DOCUMENTS

| | | | | |
|---|---|---|---|---|
| 3,576,564 A | * | 4/1971 | Galvin | 342/89 |
| 3,599,208 A | * | 8/1971 | Nelson | 342/92 |
| 3,611,369 A | * | 10/1971 | Maguire | 342/91 |
| 3,720,941 A | * | 3/1973 | Ares | 342/91 |
| 3,721,978 A | * | 3/1973 | Doggett, Jr. | 342/101 |
| 3,852,742 A | * | 12/1974 | Fletcher et al. | 342/162 |
| 3,877,010 A | * | 4/1975 | Holberg et al. | 342/161 |
| 3,877,011 A | * | 4/1975 | Holberg et al. | 342/161 |
| 3,882,498 A | * | 5/1975 | McGuffin | 342/91 |
| 3,894,219 A | * | 7/1975 | Weigel | 342/159 |
| 3,916,408 A | * | 10/1975 | Evans et al. | 342/159 |
| 3,993,994 A | * | 11/1976 | Goggins | 342/161 |
| 3,995,271 A | * | 11/1976 | Goggins, Jr. | 342/91 |
| 4,028,697 A | * | 6/1977 | Albanese et al. | 342/159 |
| 4,035,799 A | * | 7/1977 | Hsiao | 342/162 |
| 4,064,511 A | * | 12/1977 | Manfanovsky | 342/102 |
| 4,067,012 A | * | 1/1978 | Platt et al. | 342/96 |
| 4,093,949 A | * | 6/1978 | Evans | 342/98 |
| 4,119,962 A | * | 10/1978 | Lewis | 342/89 |
| 4,249,179 A | * | 2/1981 | Kolacny | 342/102 |
| 4,290,066 A | * | 9/1981 | Butler | 342/100 |
| 4,381,508 A | * | 4/1983 | Durboraw, III | 342/159 |
| 4,394,658 A | * | 7/1983 | Short, III | 342/99 |
| 4,688,044 A | * | 8/1987 | O'Brien | 342/160 |
| 4,829,307 A | * | 5/1989 | Jacomini | 342/159 |
| 5,061,934 A | * | 10/1991 | Brown et al. | 342/162 |
| 5,294,933 A | * | 3/1994 | Lee et al. | 342/159 |
| 5,327,141 A | * | 7/1994 | Sheldon | 342/159 |
| 5,418,536 A | * | 5/1995 | Lisle et al. | 342/194 |
| 5,781,149 A | * | 7/1998 | Long | 342/160 |

* cited by examiner

Primary Examiner—Bernarr E. Gregory
(74) Attorney, Agent, or Firm—J.C. Patents

(57) ABSTRACT

An embedded multi-functional preprocessing input data buffer comprises a clutter lock loop circuit, a multiplier, a mode selective multiplexer, a dual-port memory, an input multiplexer, self-testing circuit, decode circuit and an output multiplexer. The clutter lock loop and multiplication circuit selectively executes a coefficient multiplication or a clutter lock loop operation for the received data according to a working mode of the radar system. After receiving the data, the mode selective multiplexer may selectively output data processed by the clutter lock loop and multiplication circuit. The dual-port memory is coupled to the mode selective multiplexer for receiving and temporarily registering the data processed. The output multiplexer selectively outputs the data temporarily stored in the dual-port memory via a number of the output channels according to the working mode of the radar system.

12 Claims, 5 Drawing Sheets

EMBEDDED MULTI-FUNCTIONAL PREPROCESSING INPUT DATA BUFFER IN RADAR SYSTEM

BACKGROUND OF THE INVENTION

1. Field of the Invention

The present invention relates to a data buffer; and more particularly to an embedded multi-functional preprocessing input data buffer in radar system having multiple-mode signal preprocessing function for the multi-channel data and the function of modifying the sampling frequency of input data.

2. Description of the Related Art

Due to the advance of technology, a variety of radar systems have been developed for searching and tracking high-speed objects.

A prior art radar system comprises temporary register modules, variable sampling frequency modules and signal preprocessing modules. Due to the integration of these modules, the system includes lots of control and signal lines and become sophisticated. As a result, control signals during communication are easily subjected to the interference of the electrical-magnetic filed effect. The complicated backplane also cause difficulty for debugging the circuits.

Accordingly, the prior art radar system comprising temporary register modules, variable sampling frequency modules and signal preprocessing modules requires a great size. Due to the sophistication of the circuits, signals during transmission are easily subjected to the interference.

SUMMARY OF THE INVENTION

Accordingly, the present invention is directed to an embedded multi-functional preprocessing input data buffer in radar system which comprises various radar mode signal preprocessing functions for multi-channel data and modifies the sampling frequency function of the input data. With the advantage of real-time processing, the processing time for signals by the signal processor can be reduced.

The present invention discloses an embedded multi-functional preprocessing input data buffer in radar system which comprises a clutter lock loop circuit, a multiplier, a mode selective multiplexer, a dual-port memory, an input multiplexer and an output multiplexer. The clutter lock loop and multiplication circuit always executes a coefficient multiplication or selectively executes a clutter lock loop operation for the received data according to a working mode of the radar system. The mode selective multiplexer is coupled to the clutter lock loop and multiplication circuit for receiving the data and outputting data of the clutter lock loop operation selectively according to the work mode of the radar system. The dual-port memory is coupled to the mode selective multiplexer for receiving and temporarily registering the data processed and then the data can be sampled out of the dual-port memory with diverse frequency. The output multiplexer is coupled to the dual-port memory. The output multiplexer comprises a plurality of output channels, selectively outputting the data temporarily stored in the dual-port memory via a number of the output channels according to the working mode of the radar system.

According to the embodiment of the present invention, the preprocessing real-time data temporary register further comprises an input selective multiplexer for determining whether the data is from the module input data bus or the testing data memory.

According to the embodiment of the present invention, the module input data bus is coupled to the input selective multiplexer via a plurality of input channels. The input channels may comprise a SUM I/Q, a sidelobe blanker I/Q, an alpha I/Q and a beta I/Q in general.

According to the embodiment of the present invention, the working mode of the radar system comprises a clear mode, a pulsed-Doppler processor (PDP) mode, a moving target indication (MTI) mode and an auto alignment mode. While the radar system operates under the PDP mode or the MTI mode, the clutter phase-lock and multiplication circuit executes the coefficient multiplication for the data. While the radar system operates under the MTI mode, the clutter phase-lock and multiplication circuit further executes the clutter phase-lock operation for the data.

The present invention integrates the temporary register module, the variable sampling frequency module and the signal preprocessing module in a module by field programmable gate array (FPGA) and is designed with embedded-programmable control functions. Accordingly, the preprocessing real-time data temporary register of the present invention comprises various radar mode signal preprocessing functions for multi-channel data and modifies the sampling frequency function of the input data. With the advantage of real-time processing, the processing time for signals by the signal processor can be reduced.

In index to make the aforementioned and other objects, features and advantages of the present invention understandable, a preferred embodiment accompanied with figures is described in detail below.

DESCRIPTION OF SOME EMBODIMENTS

Following are the descriptions of the embedded multi-functional preprocessing input data buffer in radar system according to the present invention. The present invention, however, is not limited thereto.

Figure 1:
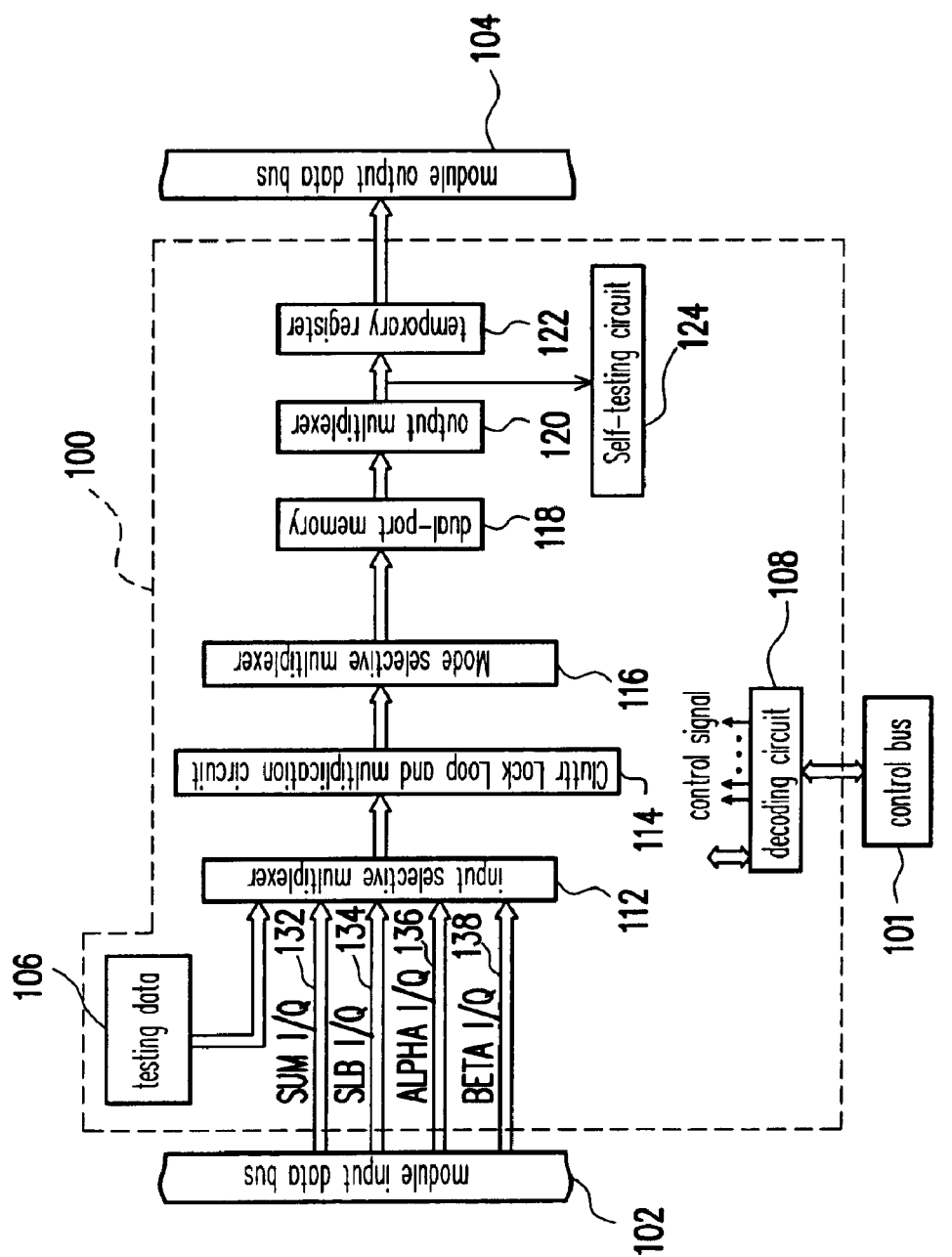
FIG. 1 is a schematic block diagram showing an embedded multi-functional preprocessing input data buffer in radar system according to an embodiment of the present invention.

FIG. 1 is a schematic block diagram showing an embedded multi-functional preprocessing input data buffer in radar system according to an embodiment of the present invention. In this embodiment, the preprocessing input data buffer 100 comprises an input selective multiplexer 112, a clutter lock loop and multiplication circuit 114, a mode selective multiplexer 116, a dual-port memory 118, an output multiplexer 120, a temporary register 122, a decoding circuit 108 and a testing-data memory 106. The preprocessing input data buffer 100 is coupled to a control bus 101, module input data bus 102 and a module output data bus 104. The module input data bus 102 can be coupled to the preprocessing input data buffer 100, for example, via a SUM I/Q 132, a sidelobe blanker I/Q 134, an alpha I/Q 136 and a beta I/Q 138. The module input data bus 102 can be from the prior module output data bus. The module output data bus 104 can be, for example, a DSP module input data bus. These data buses, however, are not limited thereto.

Each of these channels 132, 134, 136 and 138 comprises 12-bit real part and 12-bit imaginary part data. Prior to entering the preprocessing input data buffer 100, these data are extended to 16 bits.

In this embodiment, the input selective multiplexer 112 is coupled to the clutter lock loop and multiplication circuit 114 and the module input data bus 102 for determining whether the received data is from the module input data bus 102 or the testing-data memory 106. The data output from the testing-data memory 106 can be, for example, built-in self-testing data for on-line real-time testing during turn-on or reset. The data may also be, for example, output from an external data testing system, but not limited thereto.

The clutter lock loop and multiplication circuit 114 selectively executes multiplication or clutter lock loop operation for the received data according to the working mode of the radar system. The working mode of the radar system can be, for example, a clear mode, a pulsed-Doppler processor (PDP) mode, a moving target indication (MTI) mode and an auto alignment mode, but not limited thereto. While the preprocessing input data buffer 100 operates under the PDP mode or the MTI mode, the clutter lock loop and multiplication circuit 114 executes the parameter multiplication for the data. While the radar system operates under the MTI mode, the clutter lock loop and multiplication circuit 114 can selectively executes the clutter lock loop operation for the data.

In this embodiment, while operating under the clear mode, the radar system has the data hop function under a long data length. The system control index PIND determines the number of the hop that is from 1 to 16. The length of the input data is counted prior to hop; but the length of the output data is counted after hop.

During the auto alignment mode, the source of the input data is determined by the set-up of the system. By the enable time sequence output from the preprocessing input data buffer 100, the system receives the output from the first input terminal or the output from the second input terminal.

During the MTI mode, the MTI coefficient compensation of Chebyshev, Binominal and Uniform are executed. Under search mode, the clutter lock loop operation can be executed for any channel data.

Under PDP mode, the weighting coefficient compensation of the PDP is executed.

The mode selective multiplexer 116 is coupled to the clutter lock loop and multiplication circuit 114. While the clutter lock loop and multiplication circuit 114 executes the clutter lock loop operation, the mode selective multiplexer 116 may transmit the selected data of the clutter lock loop operation to the dual-port memory 118 according to the work mode of the radar system.

The dual-port memory 118 is coupled to the mode selective multiplexer 116 for receiving and temporarily storing the data. The dual-port memory 118 serves as the last data register and the output dual-address port buffer memory. According to sampling the long data length of the system index PIND in clear mode of the radar system, the dual-port memory 118 collects the whole data of the radar search or track and then transmits the data to the output multiplexer 120.

The output multiplexer 120 comprises a plurality of output channels (not shown). In this embodiment, four channels are applied. Different from the tracking mode, while the radar system scanning the objects, only the first and the second channel data are required. In order to simplify the control of the system, the four-channel signals are simultaneously executed. But the output is selectively output by the multiplexer, such as the output multiplexer 120. During search mode, the first and second channel data are simultaneously output; during track mode, a second output with the third and the fourth channel data is generated.

The temporary register 122 is coupled to the output multiplexer 120 and the module output data bus 104 for outputting the data received from the output multiplexer 120 to the module output data bus 104.

The self-testing circuit 124 adds the data output from the output multiplexer 120 so as to series transmits the data to the module output data bus 104.

The decoding circuit 108 responds the control signals and commands from the main module via VME, compact PCI or other buses so as to generate the module address decoding signals and the data bus direction control signals.

Figure 2:
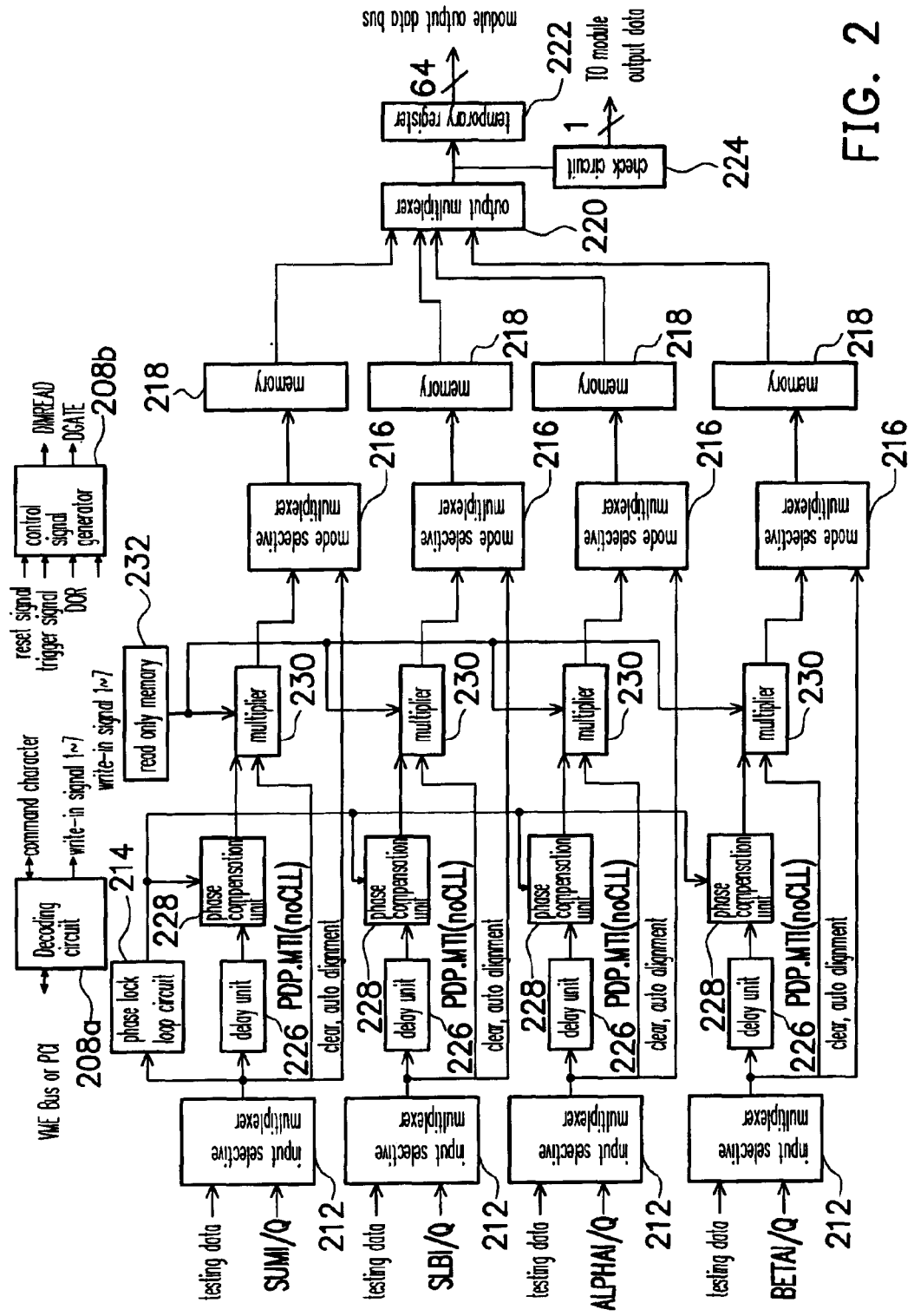
FIG. 2 is a schematic block diagram showing an embedded multi-functional preprocessing input data buffer in radar system according to an embodiment of the present invention.

FIG. 2 is a schematic block diagram showing an embedded multi-functional preprocessing input data buffer in radar system according to an embodiment of the present invention.

In this embodiment, the decoding circuit 208a is the interface circuit, receiving the control signals and commands from the main control processor of the signal processor, and transforming these signals into the control signals for the embedded multi-function preprocessing module, such as trigger signals, D0R and write-in signals 1–7.

By the control signals generated from the decoding circuit 208a, the control-signal generator 208b generates control signals of the embedded multi-function preprocessing module internal circuit, such as DGATE and DIMREAD.

The testing data are the built-in self-testing data that are provided as the source data for determining whether the preprocessing real-time data temporary register 200 operates normally. The output data combines with the radar data at the input selective multiplexer 212 for selection operation.

The input selective multiplexer 212 selects either the testing data stored in the memory or the four-channel data as input data.

The delay unit 226 delays the input data of the first channel when the radar is working in the MTI with CLL mode. While the radar system executes the MTI with CLL mode, the data from the delay unit 226 is synchronized to execute phase compensation with the first channel data output from the clutter lock loop circuit 214.

The clutter lock loop circuit 214 removes specific-speed clutter. According to the phase difference calculated from the first channel data, the pre-output value is the phase difference (0) of the first radar pulse of CLL that is transmitted to the phase compensation units 228. The clutter phase-lock circuit 214 further comprises enable time gate PHMEM_WE and FRZ_WE for saving power.

The phase compensation unit 228 compensates the phase difference between the clutter lock loop circuit 214 and the data output from the delay unit 226. The multiplier 230 executes the coefficient multiplication with the compensated data and then transmits the result to the mode selectts the result to the mode selectcompensation unit 228 further comprises an enable time gate WFST for saving power.

The read only memory 232 stores the preset weighting coefficients for the MTI and the PDP working modes of the radar system.

The multiplier 230 multiplies the selected data from the input selective multiplexer 212 with the corresponding weighting coefficients stored in the read only memory 232 during the MTI with CLL, non-clutter lock loop MTI and DPD operations. Then the data are output to the mode selective multiplexer 216. The multiplier 230 further comprises enable time gate COEF ENBL for saving power.

The dual-port memory 218 stores the radar pulse data processed of the radar beam by sampling the long length data of the system index PIND. The mode selective multiplexer 216 uses mode selections and clutter lock loop operations for triggering three selective codes so as to identify the source of the data. Then the mode selective multiplexer 216 receives the data with the clear mode or with the PDP/non-clutter lock loop MTI mode, or the data with the clutter lock loop MTI mode.

The output data from the four-channel output terminals are divided into two portions, I and Q data, and transmitted to the output multiplexer 220. It means that the first, the second, the third and the fourth channels form the I or the Q data according to the time sequence. The timing control of the data output method counts the input data by one-half of each of the input data according to the setting of the system control processor. Therefore, the last I or Q data of each radar pulse can be received simultaneously.

The output multiplexer 220 receives the I or Q data from the dual-port memories 218. During the search mode with the selective timing gate signal S/T SEL, the output multiplexer 220 selects the first and the second I/Q outputs. During the track mode, in addition to the first and the second I/Q outputs, the output multiplexer 220 also outputs the third and the fourth I/Q outputs by time-sharing processing.

The temporary register serves as an output terminal and is the driver of a module output data bus 104 as shown in FIG. 1.

The self-testing circuit 224 triggers an enable signal, adding the outputs while the radar system executes the fault detection/fault insolation (FD/FI) operation. Accordingly, the data can be series output or received by the system control processor for determination.

Figure 3:
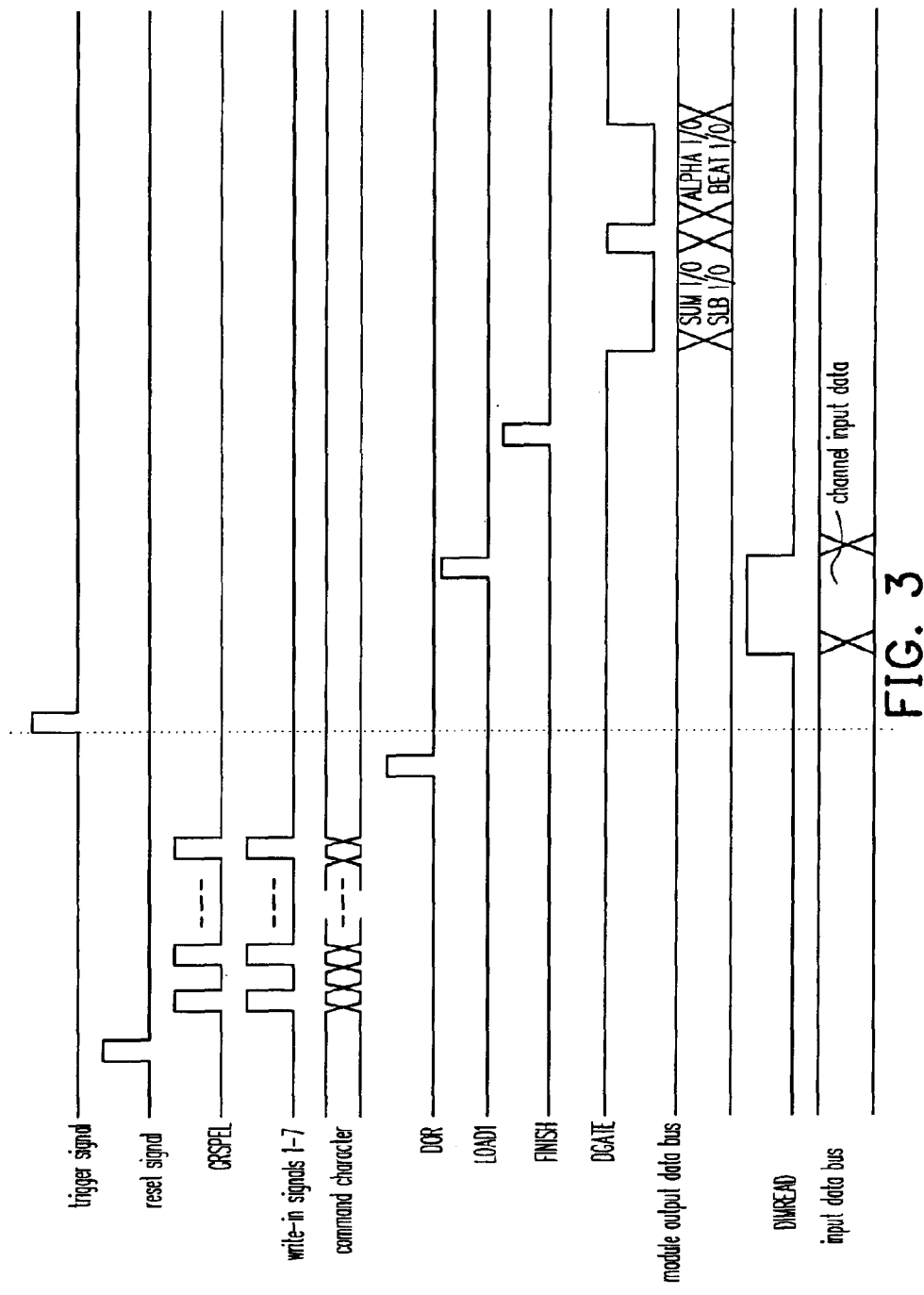
FIG. 3 is a time sequence drawing of an embedded multi-functional preprocessing input data buffer in radar system according to an embodiment of the present invention.

FIG. 3 is some of the important time sequence drawing of a preprocessing input data buffer according to an embodiment of the present invention. In this embodiment, the method first sends out the system reset signals. The signal GRPSEL and the write-in signals 1–7 are output so as to store the programming parameters of the (N-1)th radar beam in the first-layer temporary-register memory. Then the programming parameters of the (N-1)th radar beam are stored in the second-layer temporary-register memory according to the D0R signal so as to execute the control parameters. Trigger signals are output for trigger the input data.

In this embodiment, the signal DIMREAD is the trigger signal generated by the preprocessing data buffer to receive the data from the front-end data output module to the input data bus. The length of the trigger signal is an I/Q input length. The FINISH signal is the trigger signal to read the data from the dual-port memory. The DGATE signal is a company gate signal with the data received by the posterior DSP modules. During the search mode, the first channel (SUM) I/Q signal and the second channel (SLB) I/Q signal are output. During the track mode, a second gate signal is generated so as to output the third (ALPHA) I/Q signal and the fourth (BETA) I/Q signal.

Figure 4:
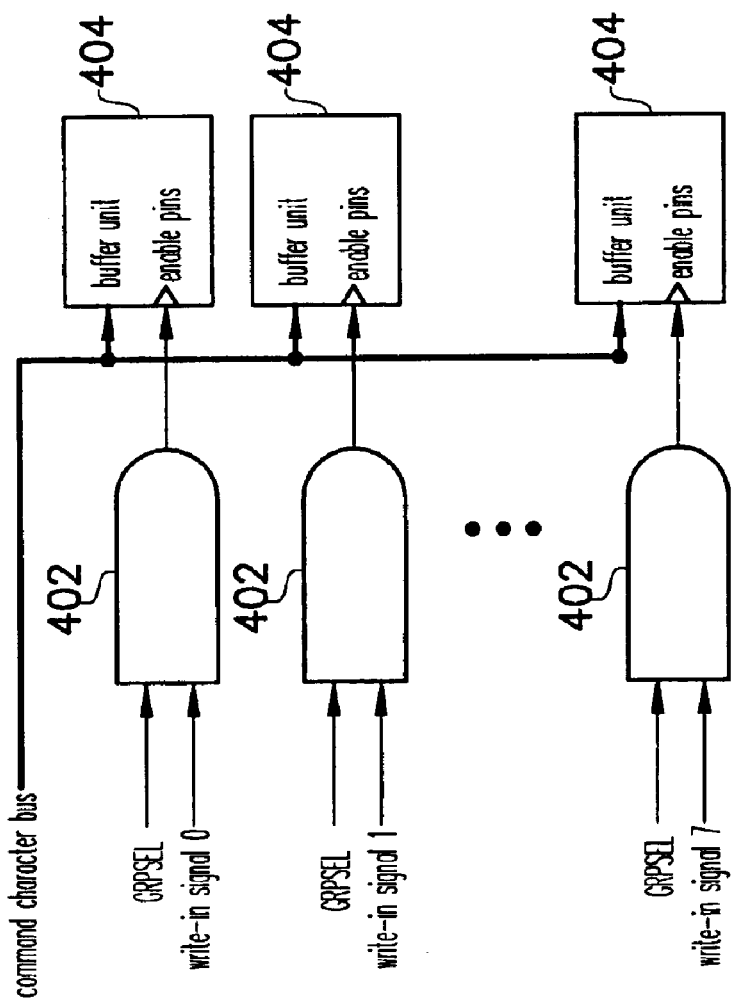
FIG. 4 is a schematic circuit showing a programming command character latch to an embodiment of the present invention.

FIG. 4 is a schematic circuit showing a temporary-register memory according to an embodiment of the present invention. In this embodiment, the temporary-register memory comprises a plurality of gates 402 and buffer units 404. The programming parameters and the corresponding bits are shown below.

| Signal | Preset index | Corresponding bits | Parameter function |
|---|---|---|---|
| Write-in signal 1 | Mode selection | [0:1] | 00: Clear<br>01: MTI<br>10: PDP<br>11: Auto align |
| | Data selection | [2] | 0: select LR/DIM<br>1: select testing data |
| | Data output length | [3:16] | I/Q output length |
| | PIND | [17:20] | The number of hops |
| | PRIC | [21:25] | The number of the data of the beam |

| Signal | Preset indexes | Corresponding bits | Parameter function |
|---|---|---|---|
| Write-in signal 2 | Data length | [31:18] | I/Q stores DRPAM length |
| | Weighting index address | [17:9] | MTI and PDP compensate index initial address |
| | Delay unit | [8:3] | Delay unit delays I/Q delay pulse number |
| | Clutter phase-lock | [2] | 0: disable clutter phase-lock<br>1: enable clutter phase-lock |
| | LRVDIM | [1] | 0: select DIM (digital FD/FI)<br>1: select LR |

| Signal | Preset index | Corresponding bits | Parameter function |
|---|---|---|---|
| Write-in signal 4 | VSP_A | [31:28] | VSP ID code; value: 0001; direction: VSP1, value: 0111; direction: VSP7. The others follow the same rule. 1101 = VSP13 |
| | Data receiving enable | [27] | 0: disable<br>1: enable |
| | Dual-port memory | [26:25] | 00: SUM · SLB<br>10: SUM · SLB + ALPHA · BETA |
| | VSP_B | [24:21] | VSP ID code; value: 0001; direction: VSP1, value: 0111; direction: VSP7. The others follow the same rule. 1101 = VSP13 |
| | VSP_A enable | [20] | 0: VSP_A disable<br>1: VSP_A enable E |
| | VSP_B enable | [19] | 0: VSP_B disable<br>1: VSP_B enable |

| Signal | Preset index | Corresponding bits | Parameter function |
|---|---|---|---|
| Write-in signal 5 | BC | [31:16] | Check code 0x5555 |
| | BCN | [15:0] | Check code 0xAAAA |

Write-in signal 7:

| Sequence | Preset index | Corresponding bits | Parameter function |
|---|---|---|---|
| 1 | Phase critical value | [15:0] | Up-limit phase critical value |
| 2 | Average length | [15:0] | Average length |
| 3 | Amplitude critical value | [15:0] | Up-limit amplitude critical value |

Figure 5:
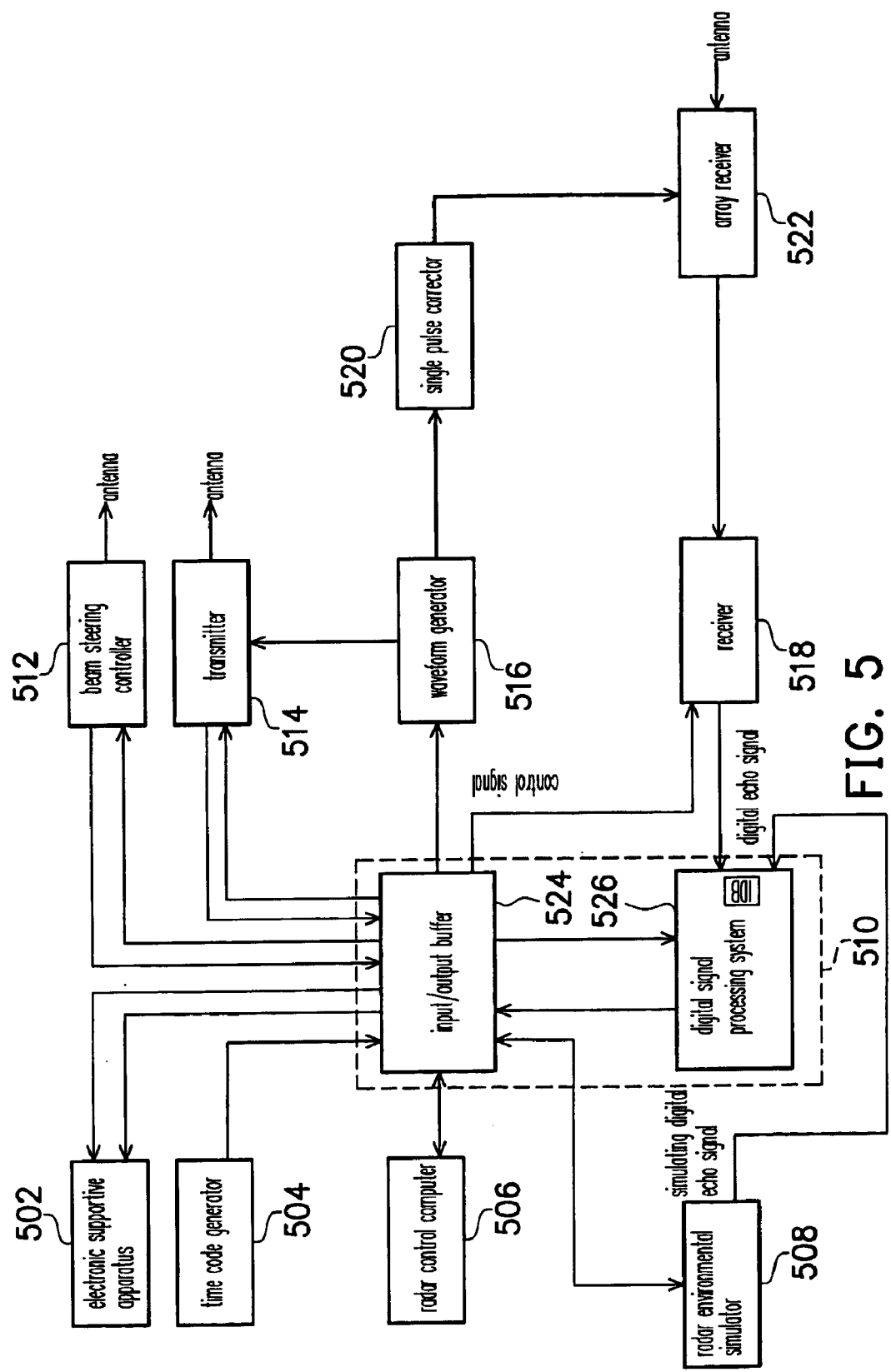
FIG. 5 is a schematic block diagram showing a phased array radar signal processor and corresponding periphery devices according to an embodiment of the present invention.

FIG. 5 is a schematic block diagram showing a phased array radar signal processor and corresponding periphery devices according to an embodiment of the present invention. In this embodiment, the periphery devices comprise a radar control computer (RCC) 506, a time code generator (TCG) 504, a transmitter (XMRT) 514, a beam steering controller (BSC) 512, a radar antenna (not shown), an array receiver 522, an electronic supportive apparatus 502 and radar environmental simulator 508. The radar signal processor 510 communicates with the periphery devices.

In this embodiment, the radar signal processor 510 comprises an analog signal processing system and a digital signal processing system, receiving the RCC commands (STIM), and executing signal processing according to the working mode of the radar system. The technology of the present invention can be referred to the digital signal processor 526 in FIG. 5.

Accordingly, the present invention integrates the temporary register module, the variable sampling frequency module and the signal preprocessing module in a module by field programmable gate array (FPGA) and is designed with embedded-programmable control functions. Accordingly, the preprocessing real-time data temporary register of the present invention comprises various radar mode signal preprocessing functions for four-channel data and modifies the sampling frequency function of the input data. With the advantage of real-time processing, the processing time for signals by the system processor can be reduced.

Although the present invention has been described in terms of exemplary embodiments, it is not limited thereto. Rather, the appended claims should be constructed broadly to include other variants and embodiments of the invention that may be made by those skilled in the field of this art without departing from the scope and range of equivalents of the invention.

What is claimed is:

1. An embedded multi-functional preprocessing input data buffer in radar system for receiving data and outputting the data to a module output data bus, the embedded multi-functional preprocessing input data buffer in radar system comprising:

a clutter lock loop and multiplication circuit, selectively executing an coefficient multiplication or a clutter lock loop operation for the received data according to a working mode of a radar system;

a mode selective multiplexer coupled to the clutter lock loop and multiplication circuit for receiving the data and selectively outputting data of the clutter lock loop operation;

a dual-port memory coupled to the mode selective multiplexer for receiving and temporarily registering the data processed; and an output multiplexer coupled to the dual-port memory, the output multiplexer comprising a plurality of output channels, selectively outputting the data temporarily registered in the dual-port memory via one of the output channels according to the working mode of the radar system.

2. The embedded multi-functional preprocessing input data buffer in radar system of claim 1, wherein the data received by the preprocessing real-time data temporary register comprise data input from a testing data memory.

3. The embedded multi-functional preprocessing input data buffer in radar system of claim 2, wherein the data received by the preprocessing real-time data temporary register comprise data input from a module input data bus.

4. The embedded multi-functional preprocessing input data buffer in radar system of claim 3, further comprising an input selective multiplexer coupled to the clutter lock loop circuit, the multiplier and the module input data bus for determining whether the data are from the module input data bus or the data testing memory.

5. The embedded multi-functional preprocessing input data buffer in radar system of claim 4, wherein the module input data bus is coupled to the input selective multiplexer via a plurality of input channels.

6. The embedded multi-functional preprocessing input data buffer in radar system of claim 1, further comprising a temporary register coupled to the output multiplexer and the module output data bus for outputting the data received by the output multiplexer to the module output data bus.

7. The embedded multi-functional preprocessing input data buffer in radar system of claim 1, further comprising a self-testing circuit for adding the output data output from the output multiplexer so as to series transmit the data to the module output data bus.

8. The embedded multi-functional preprocessing input data buffer in radar system of claim 1, wherein, according to the working mode of the radar system, the working mode comprises a clear mode, a pulsed-Doppler processor (PDP) mode, a moving target indication (MTI) mode and an auto alignment mode.

9. The embedded multi-functional preprocessing input data buffer in radar system of claim 8, wherein while the radar system operates under the PDP mode or the MTI mode, the clutter lock loop and multiplication circuit executes the multiplication for the data.

10. The embedded multi-functional preprocessing input data buffer in radar system of claim 8, wherein while under the MTI mode, the radar system may selects the clutter lock loop and multiplication circuit to execute the clutter lock loop operation for the data.

11. The embedded multi-functional preprocessing input data buffer in radar system of claim 1, wherein the module control interface bus is a VME bus, a CPCI bus or the like.

12. The embedded multi-functional preprocessing input data buffer in radar system of claim 1, further comprising a decoding circuit module coupled to the module control interface bus for responding the control signals and commands from the main module via VME, compact PCI or other buses so as to generate the module address decoding signals and the data bus direction control signals.

* * * * *